(12) United States Patent
Han et al.

(10) Patent No.: US 9,768,442 B2
(45) Date of Patent: Sep. 19, 2017

(54) CARBON ELECTRODE AND METHOD FOR MANUFACTURING THEREOF

(71) Applicant: KOREA INSTITUTE OF ENERGY RESEARCH, Yuseong-gu, Daejeon (KR)

(72) Inventors: Seong Ok Han, Daejeon (KR); Hee Yeon Kim, Daejeon (KR); In Sub Han, Nonsan-si (KR); Se Young Kim, Daejeon (KR); Young Hoon Seong, Daejeon (KR); Doo Won Seo, Daejeon (KR)

(73) Assignee: Korea Institute of Energy Research, Yuseong-gu, Daejeon (KR)

( * ) Notice: Subject to any disclaimer, the term of this patent is extended or adjusted under 35 U.S.C. 154(b) by 52 days.

(21) Appl. No.: 14/927,302

(22) Filed: Oct. 29, 2015

(65) Prior Publication Data

US 2016/0126537 A1    May 5, 2016

(30) Foreign Application Priority Data

Oct. 31, 2014    (KR) .......................... 10-2014-150034

(51) Int. Cl.
*H01M 4/133* (2010.01)
*H01M 4/04* (2006.01)
(Continued)

(52) U.S. Cl.
CPC ......... *H01M 4/133* (2013.01); *H01M 4/0471* (2013.01); *H01M 4/1395* (2013.01); *H01M 4/381* (2013.01); *H01M 10/0525* (2013.01)

(58) Field of Classification Search
CPC .. H01M 4/133; H01M 4/1395; H01M 4/0471; H01M 10/0525; H01M 4/381
See application file for complete search history.

(56) References Cited

U.S. PATENT DOCUMENTS

| | | | |
|---|---|---|---|
| 6,759,169 B1* | 7/2004 | Ohzeki | H01M 4/362 252/510 |
| 2009/0305135 A1* | 12/2009 | Shi | B82Y 30/00 429/217 |

(Continued)

FOREIGN PATENT DOCUMENTS

JP    2003100292 A    4/2003

*Primary Examiner* — Stewart Fraser
(74) *Attorney, Agent, or Firm* — Knobbe, Martens, Olson and Bear, LLP (57) ABSTRACT

Provided are a carbon electrode particularly suitable to be used as a negative electrode of an energy storing apparatus and the like and a method for manufacturing the same by forming the carbon electrode by heat-treating a natural carbon material such as a natural fiber sheet including a natural fiber or cellulose sheet including a natural cellulose fiber which is a natural material other than a petroleum-based material or a petroleum-based synthetic material to reduce manufacturing cost, shorten a manufacturing process, minimize discharge of a hazardous substance, and uniformly maintain storage capacitance even in repeated charging and discharging when being applied to the energy storing apparatus. The carbon electrode includes any one of an alkaline metal particle and an alkaline earth metal particle having an average particle size of less than 100 nm which is formed on a surface in a process of carbonizing a natural carbon material.

11 Claims, 7 Drawing Sheets

(51) Int. Cl.
*H01M 4/1395* (2010.01)
*H01M 10/0525* (2010.01)
*H01M 4/38* (2006.01)

(56) References Cited

U.S. PATENT DOCUMENTS

| | | | |
|---|---|---|---|
| 2015/0180020 A1* | 6/2015 | Komatsu | C01B 31/02 429/231.8 |
| 2015/0188137 A1* | 7/2015 | Komatsu | C01B 31/02 429/231.8 |

* cited by examiner

| Cellulose web with pre-treatment | CV | GCD |
|---|---|---|
| Raw | 0.05 | 0.34 |
| 600 °C | 2.45 | 7.1 |
| 1000 °C | 89.65 | 107.79 |
| 1300 °C | 46.76 | 55.14 |
| 1500 °C | 23.00 | 37.86 |
| 1700 °C | 12.06 | 10.95 |
| Filter paper with pre-treatment | | |
| Raw | 0.07 | 0.9 |
| 600 °C | 3.20 | 1.7 |
| 1000 °C | 24.28 | 1.83 |
| 1300 °C | 35.35 | 28.88 |
| 1500 °C | 111.54 | 117.21 |
| 1700 °C | 22.37 | 37.08 |
| Cellulose web without pre-treatment | | |
| 600 °C | 0.30 | |
| 1000 °C | 31.7 | |
| 1300 °C | 3.94 | |
| 1500 °C | 9.13 | |
| 1700 °C | 3.64 | |

CARBON ELECTRODE AND METHOD FOR MANUFACTURING THEREOF

CROSS-REFERENCE TO RELATED APPLICATION

This application claims priority to and the benefit of Korean Patent Application No. 10-2014-150034, filed on Oct. 31, 2014, the disclosure of which is incorporated herein by reference in its entirety.

BACKGROUND

Field of the Invention

The present invention, in at least some embodiments, relates to a carbon electrode and a method for manufacturing the same, and more particularly, to a carbon electrode and a method for manufacturing the same capable of shortening a manufacturing process, reducing manufacturing costs, being eco-friendly, and having a small change in storage capacitance even in charging and discharging many times.

Description of the Related Art

Recently, apparatuses for storing energy, for example, a super capacitor, a lithium-ion secondary battery, a fuel cell, and the like commonly include a positive electrode and a negative electrode.

For example, the lithium-ion secondary battery which is one of the apparatuses for storing energy includes a negative electrode, a positive electrode, separator and an electrolyte, and in the negative electrode of the lithium-ion secondary battery, graphite-based materials have been widely used, and in the positive electrode, lithium complex oxide is used.

As the graphite-based material used in the apparatuses for storing energy such as the lithium-ion secondary battery, Japan patent publication No. 2003-100292 disclosed "carbon material for negative electrode, manufacturing method thereof, and lithium-ion secondary battery using the same".

In Japan patent publication No. 2003-100292, a technique for manufacturing a carbon material for a double-coated negative electrode coated with a carbonaceous substance in which pitch is carbonized on the surface of graphite particles by heat-treating at 600° C. or more and 800° C. or less in an inert atmosphere by mixing artificial graphite, natural graphite, and liquid or solid petroleum-based pitch was disclosed.

However, according to the technique disclosed in Japan patent publication No. 2003-100292, in order to manufacture the carbon material for the negative electrode with the carbonaceous substance coated on the surface of the graphite particles, processes of preparing artificial graphite powder, natural graphite powder, and liquid or solid petroleum-based pitch, mixing the artificial graphite powder, the natural graphite powder, and the petroleum-based pitch at a predetermined ratio, and heat-treating the mixed material at 600° C. or more and 800° C. or less are required.

That is, according to the technique disclosed in Japan patent publication No. 2003-100292, in order to manufacture the carbon material for the negative electrode with the carbonaceous substance coated on the surface of the graphite particles, a very complicated manufacturing process is required, and thus, manufacturing cost of the carbon material for the negative electrode is increased and a large amount of hazardous substances is generated from the petroleum-based pitch heated in the heat-treatment process.

CITATION LIST

Patent Literature

Patent Literature 1:
Japan patent publication No. 2003-100292, carbon material for negative electrode, manufacturing method thereof, and lithium-ion secondary battery using the same (publication date: Apr. 4, 2003)

SUMMARY

An object of the present invention, at least in some embodiments, is to provide a carbon electrode particularly suitable to be used as a negative electrode of an energy storing apparatus and the like and a method for manufacturing the same by forming the carbon electrode by heat-treating a natural fiber sheet or cellulose sheet and fiber containing a natural cellulose fiber which is a natural material other than a petroleum-based material or a petroleum-based synthetic material to reduce manufacturing cost, shorten a manufacturing process, minimize discharge of a hazardous substance, and uniformly maintain storage capacitance even in repeated charging and discharging when being applied to the energy storing apparatus.

An embodiment of the present invention provides a carbon electrode including any one of an alkaline metal particle and an alkaline earth metal particle having an average particle size of less than 100 nm which is formed on a surface in a process of carbonizing a natural material.

The alkaline metal particle and the alkaline earth metal particle may be any one of calcium (Ca), magnesium (Mg), and potassium (K).

Specific capacitance of the carbon electrode may be 80 F/g to 150 F/g.

A specific surface area of the carbon electrode may be 300 $m^2/g$ to 350 $m^2/g$ and a pore volume of the carbon electrode may be 0.02 $cm^2/g$ to 0.25 $cm^2/g$.

Another embodiment of the present invention provides a method for manufacturing a carbon electrode, the method including: preparing a carbon material including a natural fiber sheet containing a natural fiber or a cellulose sheet containing a cellulose fiber; and forming a carbon electrode by carbonizing the carbon material at a high temperature, in which in the high temperature carbonizing process, the carbon material is carbonized at a temperature in which a particle size of any one of an alkaline metal particle and an alkaline earth metal particle formed while carbonizing the carbon electrode is 100 nm or less.

In the preparing of the carbon material, the carbon material includes pulp extracted from at least one of cotton, hemp, flax, jute, kenaf, henequen, wool, and silk.

The carbon material may be formed in a sheet shape in which fibers having a length of 10 cm to 70 cm and a diameter of 4 μm to 200 μm are clotted.

In the carbonizing, when the carbon material is the natural fiber sheet, the temperature may be 900° C. or more and 1,100° C. or less, and in the carbonizing, when the carbon material is the cellulose sheet, the temperature may be 1,300° C. or more and 1,500° C. or less.

In the carbonizing, when the carbon material is the natural fiber sheet, the temperature may be 1,000° C. and in the carbonizing, when the carbon material is the cellulose sheet, the temperature may be 1,500° C.

In the carbonizing, the alkaline metal and the alkaline earth metal formed in the carbon electrode may be any one of calcium (Ca) in a solid state, magnesium (Mg) in a solid state, and potassium (K) in a solid state.

According to some embodiments of the present invention, when the carbon electrode is manufactured by forming the carbon electrode using the carbon material, the carbon electrode is eco-friendly formed by reducing the discharge of a pollutant causing environmental pollution, the number of processes for manufacturing the carbon electrode is reduced, and as a result, the manufacturing cost of the carbon electrode may be largely reduced.

DETAILED DESCRIPTION OF THE PREFERRED EMBODIMENTS

It should be noted that in the following description, only a part required to understand operations according to various exemplary and non-limiting embodiments of the present invention will be described and a description of other parts will be skipped to obscure the spirit of various embodiments of the present invention.

Terms or words used in the present specification and claims should not be interpreted as being limited to typical or dictionary meanings, but should be interpreted as having meanings and concepts which comply with the technical spirit of various embodiments of the present invention, based on the principle that an inventor can appropriately define the concept of the term to describe his/her own invention and various embodiments thereof in the best manner. Therefore, configurations illustrated in the embodiments and the drawings described in the present specification illustrate some of preferred, non-limiting embodiments of the present invention and do not represent all of the technical spirit of the present invention, and thus it is to be understood that various modified examples, which may replace the configurations, are possible when filing the present application.

Figure 1:
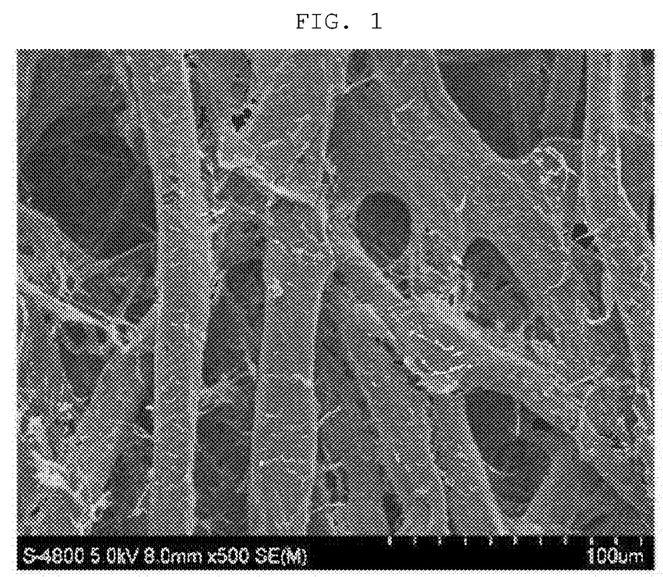
FIG. 1 is a scanning electron microscope (SEM) photograph of a carbon material which is a material for a carbon electrode according to an embodiment of the present invention.
Figure 2:
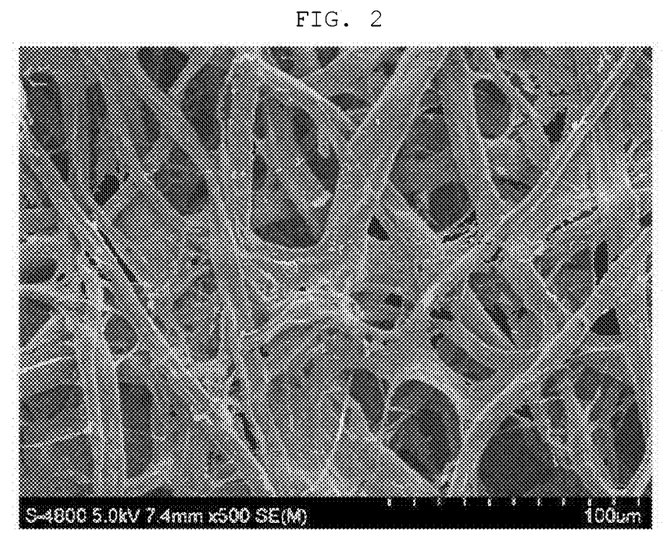
FIG. 2 is a scanning electron microscope (SEM) photograph of a carbon electrode formed by carbonizing the carbon material illustrated in FIG. 1 according to some embodiments of the present invention.

FIG. 1 is a scanning electron microscope (SEM) photograph of a carbon material which is a material for a carbon electrode according to an embodiment of the present invention. FIG. 2 is a scanning electron microscope (SEM) photograph of a carbon electrode formed by carbonizing the carbon material illustrated in FIG. 1 according to some embodiments of the present invention.

A carbon electrode 100 according to an embodiment of the present invention may be applied to a negative electrode of electrodes of a super capacitor, a lithium-ion secondary battery, or a fuel cell which is an energy storing apparatus.

The carbon electrode 100 applied to the negative electrode of the energy storing apparatus has characteristics of being manufactured with a very low price, having an excellent electrical conductivity, a very simple manufacturing process, and a very small discharge amount of hazardous substance, and having a low change of storage capacitance by repeatedly performing charging and discharging by applying the carbon electrode to the energy storing apparatus.

In order to implement the characteristics, the carbon material 1 which is the material of the carbon electrode 100 uses a natural fiber as a main material.

In some embodiments of the present invention, when the main material of the carbon material 1 is used as the natural fiber, like the related art, as compared with a case where rayon, polyacrylonitrile, and pitch which are extracted from petroleum are used as the carbon material, since the discharge amount of hazardous substance is very small, the carbon material 1 is eco-friendly, and since the carbon electrode 100 may be manufactured through a very simple manufacturing process, the carbon material 1 is very important in the present invention, in at least some embodiments.

The carbon material 1 may use a vegetable fiber such as cotton, hemp, flax, jute, kenaf, and henequen or an animal fiber such as wool and silk. In some embodiments of the present invention, even though several materials are disclosed in the carbon material 1, various kinds of vegetable natural fiber or animal natural fibers may be used.

The vegetable fiber has a filament shape having a length of about 60 cm to 70 cm and a diameter may be about 150 nm to about 200 nm and an average density may be 1.45 g/cm$^3$. Of course, the carbon material 1 may include a cellulose fiber having a diameter of about 4 μm to about 8 μm smaller than the vegetable fiber.

The carbon material 1 is implemented by a natural fiber sheet, an animal fiber sheet, or a cellulose fiber sheet formed by binding vegetable fibers, animal fibers, or cellulose fibers.

TABLE 1

| Material | Cellulose (wt %) | Hemicellulose (wt %) | Lignin (wt %) | Impurity (wt %) |
| --- | --- | --- | --- | --- |
| Natural fiber | 77.6 | 4 to 8 | 13.1 | 1.0 to 5.0 |
| Cellulose fiber | 98 | — | — | 2 |

According to Table 1, the natural fiber which is the material of the carbon material 1 has a configuration in which cellulose and hemicellulose are mixed and includes impurity of 1.0 wt % to 5.0 wt %.

The cellulose fiber includes cellulose of 98 wt % and impurity of 2 wt %.

In some embodiments of the present invention, the natural fiber sheet including natural fibers which is the material of the carbon electrode 100 or the cellulose fiber sheet including the cellulose fibers may be implemented by a sheet by preparing or purchasing the natural fibers or the cellulose fibers.

Unlike this, the carbon material 1 which is the material of the carbon electrode 100 may purchase and use a cotton pulp sheet or a filter paper which is a readymade product having a similar composition to Table 1.

In the case of using the natural fiber sheet including the natural fibers or the cellulose fiber sheet including the cellulose fibers as the carbon material 1 for implementing the carbon electrode 100, the carbon material 1 has advantages of being eco-friendly because the discharge amount of the hazardous substance is very small, being manufactured by a very simple manufacturing process, and having very low manufacturing cost.

On the contrary, as listed in Table 1, in the carbon material 1 according to certain embodiments of the present invention, impurity of 1.0 wt % to 5 wt % is included due to the manufacturing characteristic.

As such, in the case of forming the carbon electrode 100 by carbonizing the carbon material 1 including impurity of 1.3 wt % to 5 wt %, the case has various advantages, while problems which are not generated when using rayon, polyacrylonitrile, and pitch which are the carbon materials extracted from petroleum in the related art are newly generated.

The problem is generated due to the impurity of 1.0 wt % to 5 wt % included in the carbon material 1 in the process of carbonizing the carbon electrode 100, and as the problem, an electrical characteristic of the carbon electrode 100 is largely reduced.

Figure 3:
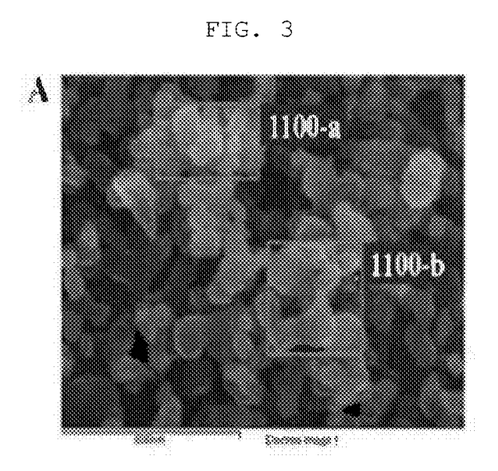
FIG. 3 is a scanning electron microscope (SEM) photograph of a surface of the carbon electrode.
Figure 4:
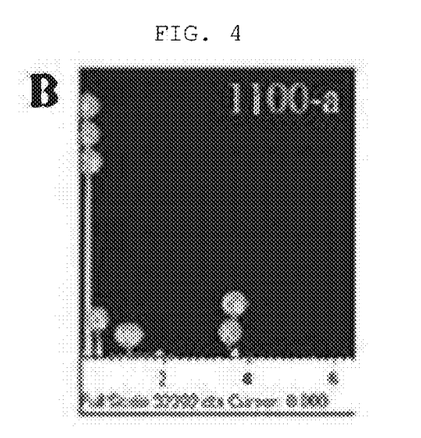
FIGS. 4 and 5 are analysis graphs of an energy dispersive X-ray spectrometer (EDX) of the carbon electrode of FIG. 3.
Figure 5:
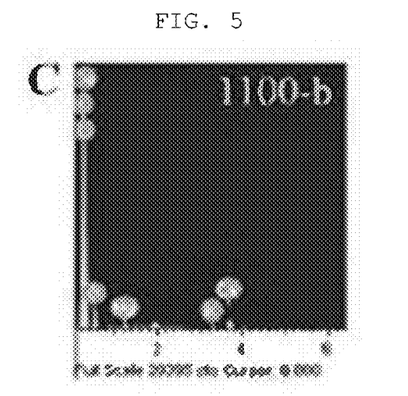

FIG. 3 is a scanning electron microscope (SEM) photograph of a surface of the carbon electrode. FIGS. 4 and 5 are analysis graphs of an energy dispersive X-ray spectrometer (EDX) of the carbon electrode of FIG. 3.

As illustrated in FIGS. 4 and 5, after an EDX analysis is performed at two different positions of the carbon electrode 100, calcium (Ca), potassium (K) or magnesium (Mg) which is an alkaline metal particle or an alkaline earth metal particle was detected on the surface of the carbon electrode 100.

The alkaline metal particle or the alkaline earth metal particle generated on the surface of the carbon electrode 100 is estimated to be generated due to impurity of 1.3 wt % to 5 wt % included in the carbon material 1.

An alkaline metal particle or an alkaline earth metal particle in a solid state generated on the surface of the carbon electrode 100 has a nonconductive characteristic, and an alkaline metal particle or an alkaline earth metal particle formed on the surface of the carbon electrode 100 while carbonizing the carbon material 1 interrupts with generation of a carbon crystal which applies conductivity to the carbon electrode 100 to have a negative effect on an electrical property of the carbon electrode 100.

In some embodiments of the present invention, the electrical property due to alkaline metal or alkaline earth metal formed in the carbon electrode 100 is influenced by a particle size of the alkaline metal or the alkaline earth metal.

In some other embodiments of the present invention, when an average particle size of the alkaline metal particle or the alkaline earth metal particle generated while carbonizing the carbon material 1 is about 100 nm or more, the electrical property of the carbon electrode 100 is reduced in proportion to the average particle size of the alkaline metal particle or the alkaline earth metal particle.

Accordingly, a process condition is controlled so that the average particle size of the alkaline metal particle or the alkaline earth metal particle generated while carbonizing the carbon material 1 is about 100 nm or less to maximize the electrical property of the carbon electrode 100 and prevent reduction in the electrical property of the carbon electrode 100.

Even in some embodiments of the present invention, it is described that the average particle size of the alkaline metal particle or the alkaline earth metal particle generated on the surface of the carbon electrode 100 or inside the carbon electrode 100, but the average particle size of the alkaline metal particle or the alkaline earth metal particle may vary according to a material of the carbon material 1 constituting the carbon electrode 100.

In certain embodiments of the present invention, when the average particle size of the alkaline metal particle or the alkaline earth metal particle is about 100 nm or less, for example, electrical properties of the carbon electrode which carbonizes the natural fiber sheet are as follows.

Figure 6:
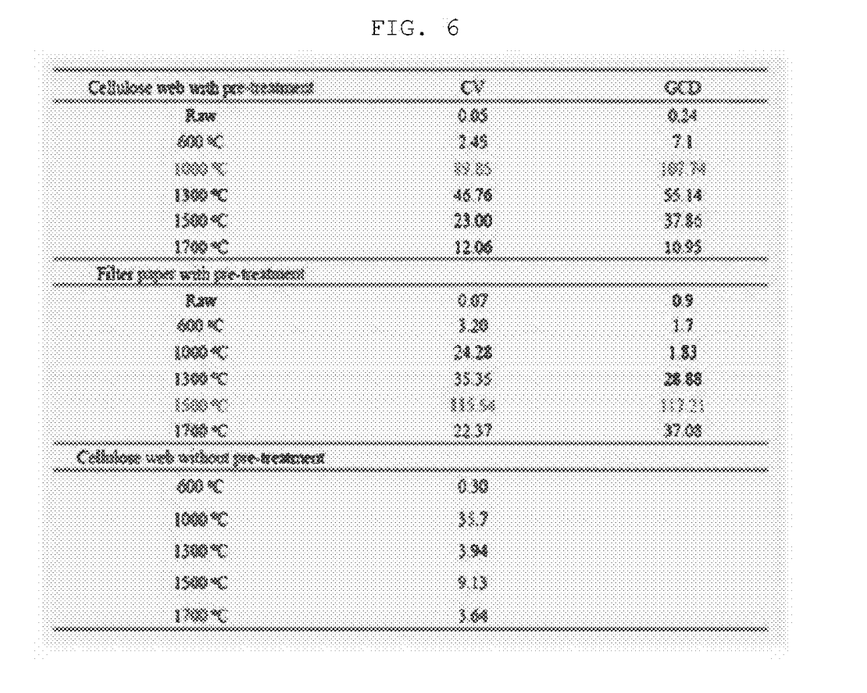
FIG. 6 is a graph illustrating specific capacitance of the carbon electrode according to a carbonizing temperature.

When the average particle size of the alkaline metal particle or the alkaline earth metal particle of the carbon electrode which carbonizes the natural fiber sheet as the carbon material 1 is about 100 nm or less (at a carbonizing temperature of 1,100° C. or less), the carbon electrode 100 measured with cyclic voltammetry (CV) equipment has specific capacitance of about 80 F/g to 90 F/g as illustrated in FIG. 6 and the carbon electrode 100 measured with galvanostatic charge & discharge (GCD) equipment has specific capacitance of about 100 F/g to 110 F/g.

Further, when the average particle size of the alkaline metal particle or the alkaline earth metal particle of the carbon electrode which carbonizes the natural fiber sheet as the carbon material 1 is about 100 nm or less (at a carbonizing temperature of 1,100° C. or less), a specific surface area of the carbon electrode 100 may be about 300 $m^2/g$ to 350 $m^2/g$ and a pore volume may be 0.2 $cm^2/g$ to 0.5 $cm^2/g$.

Figure 7:
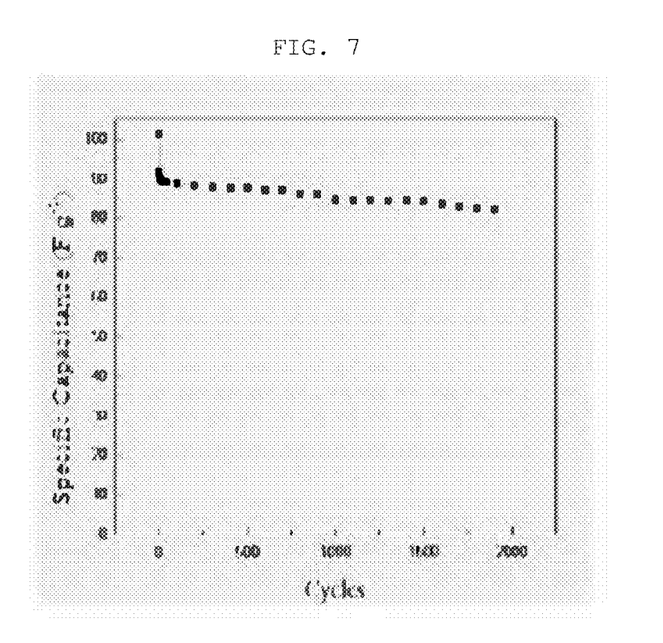
FIG. 7 is a graph illustrating a change in storage capacitance according to charging and discharging in a lithium-ion secondary battery to which the carbon electrode is applied.

Further, in the case where the average particle size of the alkaline metal particle or the alkaline earth metal particle of the carbon electrode which carbonizes the natural fiber sheet as the carbon material 1 is about 100 nm or less, when a charging and discharging test of about 2,000 times is performed in a charging and discharging test of a secondary battery using the carbon electrode 100, as illustrated in FIG. 7, specific capacitance in charging and discharging of two times, 500 times, 1,000 times, and 2,000 times is varied between 90% and 80% and thus the specific capacitance is very excellently maintained.

According to some embodiments of the present invention, in the case of using a natural fiber sheet including natural fibers or a cellulose fiber sheet including cellulose fibers without using a petroleum-based carbon material as a carbon material, in a manufacturing process, a discharge of the hazardous substance is suppressed, the number of manufacturing processes is reduced, and thus, manufacturing cost is reduced and an excellent electrical property may be implemented.

However, in the case of using the natural fiber sheet or the cellulose fiber sheet, since there is a limit in largely reducing the electrical property of the carbon electrode by a size of the alkaline metal particle or the alkaline earth metal particle on the surface of the carbon electrode or inside the carbon electrode while manufacturing the carbon electrode, the average particle size of the alkaline metal particle or the alkaline earth metal particle after carbonizing the carbon material 1 is 100 nm or less to prevent the electrical property of the carbon electrode from being reduced.

Hereinafter, a method of manufacturing a carbon electrode according to another embodiment of the present invention will be described, and a method of manufacturing a carbon electrode by using a natural fiber sheet including cotton pulp which is a natural fiber will be described.

Figure 8:
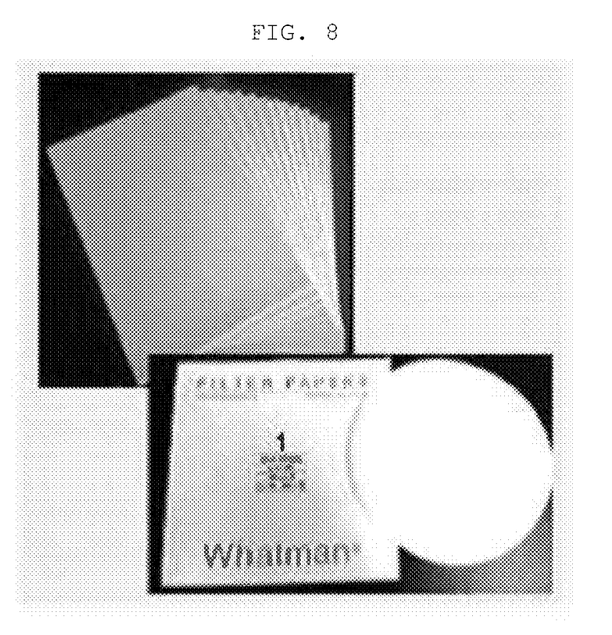
FIG. 8 is a diagram illustrating a natural carbon material for manufacturing the carbon electrode according to some embodiments of the present invention.
Figure 9:
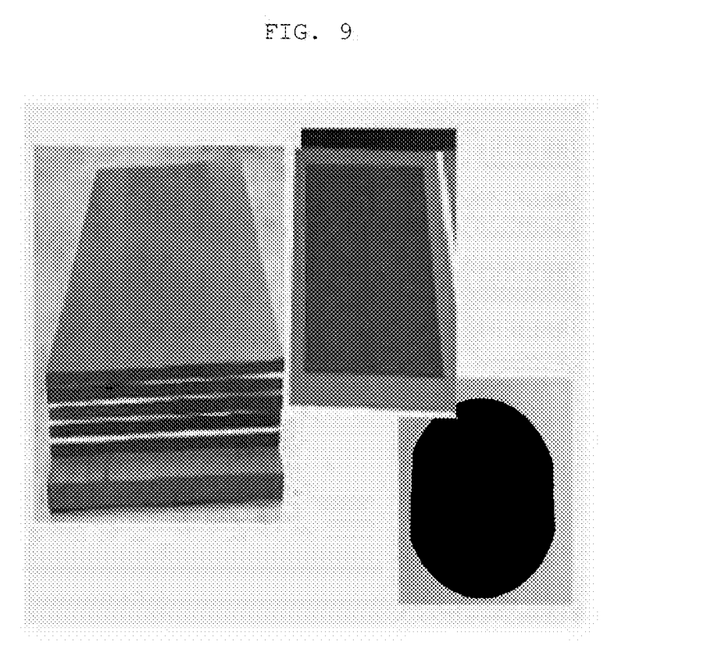
FIG. 9 is a diagram illustrating a preliminary carbon electrode formed by carbonizing the natural carbon material of FIG. 8 at a low temperature.
Figure 10:
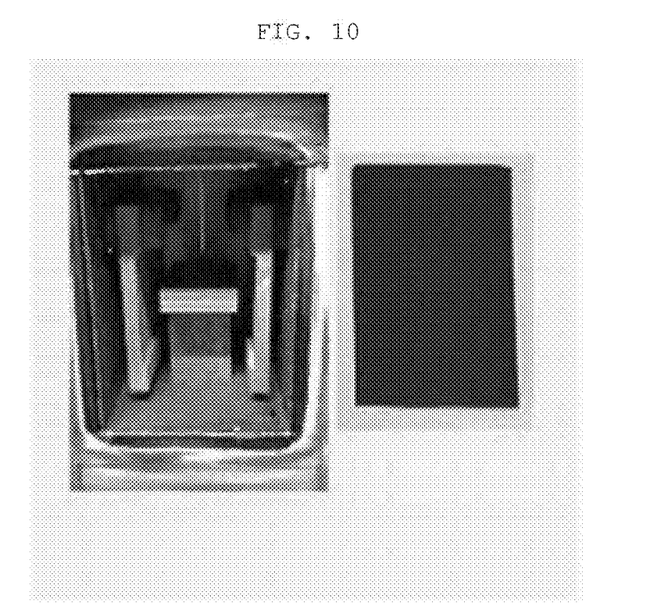
FIG. 10 is a diagram illustrating a carbon electrode formed by carbonizing the preliminary carbon electrode of FIG. 9 at a high temperature.

FIG. 8 is a diagram illustrating a natural carbon material for manufacturing the carbon electrode according to an embodiment of the present invention. FIG. 9 is a diagram illustrating a preliminary carbon electrode by carbonizing the natural carbon material of FIG. 8 at a low temperature. FIG. 10 is a diagram illustrating a carbon electrode formed by carbonizing the preliminary carbon electrode of FIG. 9 at a high temperature.

First, in order to manufacture the carbon electrode, preparing a carbon material illustrated in FIG. 8 is performed.

In some embodiments of the present invention, the carbon material 1 uses a natural fiber sheet or a natural cellulose fiber including cotton pulp as a natural fiber without using a petroleum-based carbon material such as rayon, polyacrylonitrile, and pitch.

In certain embodiments of the present invention, in a process of forming a preliminary carbon electrode to be described below and the carbon electrode by using the natural fiber sheet without using the petroleum-based carbon material such as rayon, polyacrylonitrile, and pitch, discharge of the hazardous substance may be largely suppressed.

Meanwhile, in order to form the natural fiber sheet, impurities of about 1.0 wt % to about 5.0 wt % are added to fibers formed in a filament shape having a long length and serves to fix the fibers in a clotted state.

In an embodiment of the present invention, as a natural carbon material, cotton pulp is prepared, and the cotton pulp is prepared in a sheet shape. Unlike this, in another embodiment of the present invention, in the natural carbon material, impurity of about 1.0 wt % to about 5.0 wt % is included in the cotton pulp and a readymade filter product used as a filter and the like may be used.

In an embodiment of the present invention, for example, a carbon electrode is formed by using the readymade filter product in which the impurity of about 1.0 wt % to about 5.0 wt % is included in the cotton pulp.

When specific capacitance as an electrical property of the readymade filter product is measured by CV equipment, the specific capacitance is about 0.05 F/g, when the specific capacitance is measured by GCD equipment, the specific capacitance is 0.24 F/g, and when the specific capacitance is measured by the CV equipment and the GCD equipment, the readymade filter product is nonconductive.

Figure 11:
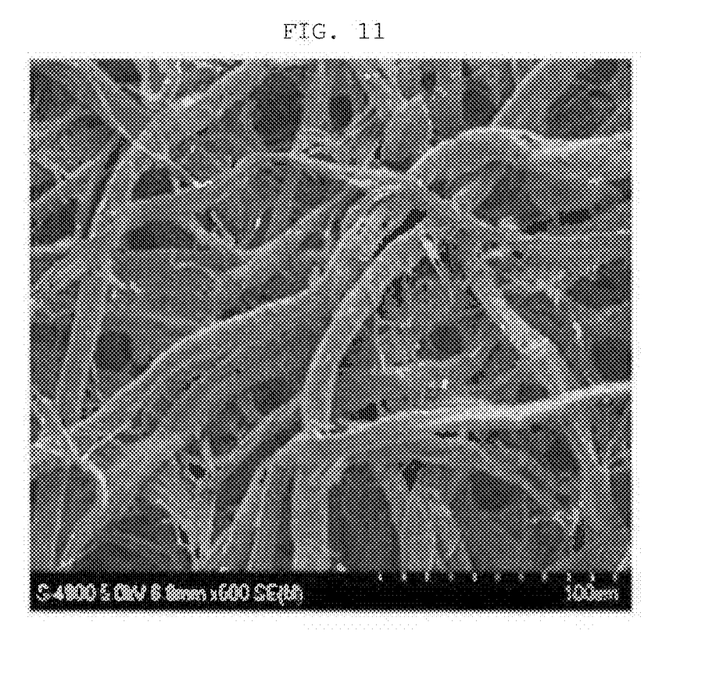
FIG. 11 is a scanning electron microscope (SEM) photograph illustrating the preliminary carbon electrode formed by primarily carbonizing the natural carbon material of FIG. 1.

FIG. 11 is a scanning electron microscope (SEM) photograph illustrating the preliminary carbon electrode formed by primarily carbonizing the natural carbon material of FIG. 1.

Referring to FIG. 11, when a natural carbon material including a natural fiber of about 77.6 wt % and impurity of 1.0 wt % to 5.0 wt % is prepared, a process of manufacturing a preliminary carbon electrode by primarily carbonizing the natural carbon material is performed.

In the process of manufacturing the preliminary carbon electrode, a natural carbon material is carbonized at a first temperature of a low temperature and at least a part of the impurity of 1.0 wt % to 5.0 wt % included in the natural carbon material is removed from the natural carbon material, the natural fiber is changed to carbon, and porosity is applied to the preliminary carbon electrode according to removal of the impurity.

In an embodiment of the present invention, the process of manufacturing the preliminary carbon electrode may be performed in a quartz chamber and the like, the first temperature for carbonizing the preliminary carbon electrode in the quartz chamber is about 600° C., a carbonizing time is about 30 minutes, and inert gas such as nitrogen is provided to the quartz chamber in order to fundamentally prevent the natural carbon material from chemically reacting with oxygen and the like.

Figure 12:
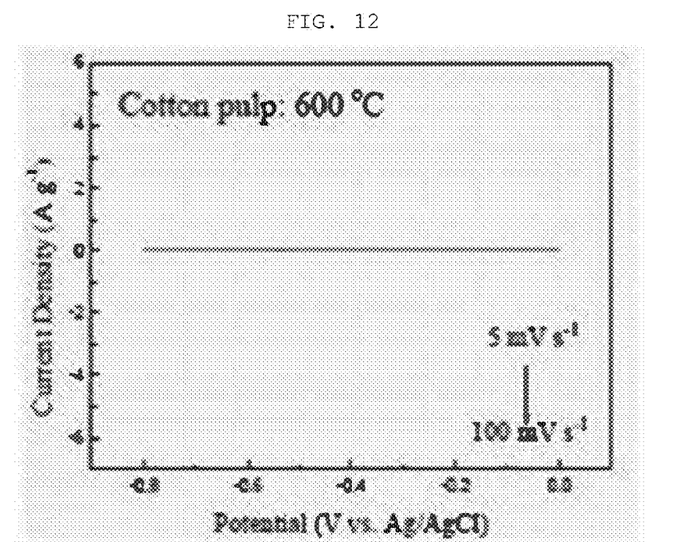
FIG. 12 is a graph measuring specific capacitance of the preliminary carbon electrode with cyclic voltammetry (CV) equipment.

FIG. 12 is a graph measuring specific capacitance of the preliminary carbon electrode with cyclic voltammetry (CV) equipment.

Referring to FIG. 12, when specific capacitance of the preliminary carbon electrode primarily carbonized at a temperature of about 600° C. for about 30 minutes is measured by CV equipment, the specific capacitance is 2.15 F/g and when specific capacitance of the preliminary carbon electrode is measured by GCD equipment, the specific capacitance is 7.1 F/g.

As the measured result, an electrical property of the preliminary carbon electrode has nonconductivity similar to the natural carbon material, and accordingly, the preliminary carbon electrode is difficult to be used as a negative electrode of an energy storing apparatus and the like.

The reason why the electrical property of the preliminary carbon electrode is not good is that in the preliminary carbon electrode carbonized at the low temperature, the natural fiber is just carbonized to carbon and the carbon carbonized from the natural fiber is not changed to a polycrystal structure.

Referring back to FIG. 2, after forming the preliminary carbon electrode by performing low-temperature carbonization at the temperature of about 600° C., the preliminary carbon electrode is provided in the quartz chamber and carbonized at a second temperature of a high temperature which is higher than the first temperature to manufacture the carbon electrode for being used as a negative electrode of the energy storing apparatus.

In some embodiments of the present invention, the second temperature may be about 900° C. to about 1,100° C. and preferably 1,000° C.

Referring back to FIG. 6, in some embodiments of the present invention, the carbon electrode formed carbonized at the high temperature which is the second temperature has an excellent electrical property as compared with the preliminary carbon electrode by crystallization of carbon. For example, the carbon electrode high-temperature carbonized at the second temperature of about 1,000° C. for about 30 minutes has very high specific capacitance as compared with the preliminary carbon electrode when the specific capacitance is measured by CV equipment.

With respect to the carbon electrode high-temperature carbonized at about 1,000° C., when the specific capacitance is measured by the CV equipment, the specific capacitance of the carbon electrode is 89.85 F/g and when the specific capacitance of the carbon electrode is measured by the GCD equipment, the specific capacitance is 107.74 F/g. That is, the specific capacitance of the carbon electrode is measured much higher than the specific capacitance of the natural fiber and the preliminary carbon electrode, and the carbon electrode has a very excellent electrical property as compared with the natural fiber or the preliminary carbon electrode.

Hereinafter, a Comparative Example in which the preliminary carbon electrode is carbonized at 1,300° C., 1,500° C., and 1,700° C. to form the carbon electrode will be described.

Comparative Example 1

Specific capacitance measured by the CV equipment of the carbon electrode carbonized at about 1,300° C. in the same apparatus, the same method, and the same condition as when the carbon electrode is formed by carbonizing the preliminary carbon electrode at about 1,000° C. is about 46.76 F/g, and the specific capacitance measured by the GCD equipment is about 55.15 F/g.

Comparative Example 2

Specific capacitance measured by the CV equipment of the carbon electrode carbonized at about 1,500° C. in the same apparatus, the same method, and the same condition as when the carbon electrode is formed by carbonizing the preliminary carbon electrode at about 1,000° C. is about 23.0 F/g, and the specific capacitance measured by the GCD equipment is about 37.86 F/g.

Comparative Example 3

Specific capacitance measured by the CV equipment of the carbon electrode carbonized at about 1,700° C. in the same apparatus, the same method, and the same condition as when the carbon electrode is formed by carbonizing the preliminary carbon electrode at about 1,000° C. is about 12.0 F/g, and the specific capacitance measured by the GCD equipment is about 10.95 F/g.

According to Comparative Examples 1 to 3, the electrical property of the carbon electrode manufactured by carbonizing the preliminary carbon electrode at about 1,300° C., about 1,500° C., and about 1,700° C. was rapidly reduced as compared with the electrical property of the carbon electrode manufactured by carbonizing the preliminary carbon electrode at about 1,000° C.

When performing the experiment under the same condition, it is estimated that the reason why the electrical property of the carbon electrode is rapidly reduced in Comparative Examples 1 to 3 is that while the size of the alkaline metal particle and the alkaline earth metal particle which have the nonconductivity in a solid state by the impurity included in the natural carbon material as the natural fiber which is the material of the carbon electrode is grown by heat to interrupt with the growth of the carbon crystal having the conductivity.

Particularly, the size growth of the alkaline metal particle and the alkaline earth metal particle having the nonconductivity in the solid state is closely related to a temperature.

In detail, when the high carbonizing temperature of the preliminary carbon electrode is about 900° C. or less, carbon is not sufficiently transformed into the carbon crystal and thus the electrical property of the carbon electrode becomes bad. When the high carbonizing temperature of the preliminary carbon electrode is about 1,300° C. or more, the size of the alkaline metal particle and the alkaline earth metal particle having the nonconductivity in the solid state and interrupting with the growth of the carbon crystal is excessively increased and thus the electrical property deteriorates.

Accordingly, in order to improve the electrical property by sufficiently transforming carbon of the preliminary carbon electrode into the carbon crystal and improve the electrical property by suppressing the increase in the size of the alkaline metal particle and the alkaline earth metal particle, it is preferred that the high carbonizing temperature of the preliminary carbon electrode is about 900° C. to about 1,100° C.

Meanwhile, in certain embodiments of the present invention, in the case of forming the carbon electrode by using the cellulose fiber sheet and the like including a pure cellulose fiber as the natural carbon material and having a small content of impurity, since the cellulose fiber sheet includes the small content of impurity, the most excellent conductive property of the carbon electrode may be implemented by carbonizing the cellulose fiber sheet at a temperature of about 1,400° C. to about 1,500° C. in the high-temperature carbonizing process.

According to some embodiments of the present invention, the carbon electrode is formed by using the natural carbon material having a small discharge amount of the hazardous substance causing environmental pollution while manufacturing the carbon electrode as the material, and in the case of using the natural carbon material, the discharge of the hazardous substance is reduced, the manufacturing process is largely simplified, and manufacturing cost is largely reduced.

In order to implement the natural carbon material in a sheet shape having a structure in which pulp or filaments are clotted to each other, 1 wt % to 5 wt % of impurity other than the natural fiber needs to be added to the natural carbon material, but the impurity added in the natural carbon material has a significant effect on the electrical property of the carbon electrode according to a carbonizing temperature of the natural carbon material.

In spite of the impurity added in the natural carbon material, in order to improve the electrical property of the carbon electrode, the natural carbon material is primarily carbonized by the low-temperature carbonizing process and thus, the preliminary carbon electrode in which the impurity included in the natural carbon material is maximally removed is formed.

The preliminary carbon electrode formed by the low-temperature carbonizing process is secondarily carbonized by the high-temperature carbonizing process to perform the carbon crystallization of carbon and form a carbon electrode having an excellent electrical property.

When the carbon electrode is formed by carbonizing the preliminary carbon electrode in the high-temperature carbonizing process, in the case of a natural fiber material containing a natural fiber having a high content of impurity, the carbon crystallization of carbon is promoted and the average particle size of alkaline metal particles and alkaline earth metal particles is excessively increased by performing the high-temperature carbonizing process at a temperature range of about 900° C. to about 1,100° C., and thus the entire electrical property of the carbon electrode is improved so as not to reduce the electrical property.

Meanwhile, when the carbon electrode is formed by carbonizing the preliminary carbon electrode in the high-temperature carbonizing process, in the case of a cellulose fiber material containing a cellulose fiber having a low content of impurity, the carbon crystallization of carbon is promoted and the average particle size of alkaline metal particles and alkaline earth metal particles is excessively increased by performing the high-temperature carbonizing process at a temperature range of about 1,400° C. to about 1,500° C., and thus the entire electrical property of the carbon electrode is improved so as not to reduce the electrical property.

The carbon electrode formed by forming the preliminary carbon electrode by low-temperature carbonizing the natural fiber material and high-temperature carbonizing the preliminary carbon electrode again may be used as electrodes of various energy storing apparatuses and the like such as a super capacitor, a lithium-ion secondary battery, and a fuel cell.

Referring back to FIGS. 7 and 15, a test of repeatedly charging and discharging the lithium-ion secondary battery using the carbon electrode illustrated in FIG. 15 as the negative electrode 500 times, 1,000 times, 1,500 times, and 2,000 times is performed, and as a result, storage capacitance of the lithium-ion secondary battery is maintained at 90% to 95% and in spite of the multiple charging and discharging, the storage capacitance is uniformly maintained.

As described above in detail, when the carbon electrode is manufactured by forming the carbon electrode using the natural carbon material, the carbon electrode is eco-friendly formed by reducing the discharge of a pollutant causing environmental pollution, the number of processes for manufacturing the carbon electrode is reduced, and as a result, the manufacturing cost of the carbon electrode may be largely reduced.

While the present invention has been described with respect to various specific, non-limiting embodiments, it will be apparent to those skilled in the art that various changes and modifications may be made without departing from the spirit and scope of the invention.

What is claimed is:

1. A carbon electrode comprising: any one of an alkaline metal particle and an alkaline earth metal particle having an average particle size of less than 100 nm which is formed on a surface of the carbon electrode by a process of carbonizing a natural carbon material.

2. The carbon electrode of claim 1, wherein the alkaline metal particle and the alkaline earth metal particle are any one of calcium (Ca), magnesium (Mg), and potassium (K).

3. The carbon electrode of claim 1, wherein a specific capacitance of the carbon electrode is 80 F/g to 150 F/g.

4. The carbon electrode of claim 1, wherein a specific surface area of the carbon electrode is 300 $m^2$/g to 350 $m^2$/g and a pore volume of the carbon electrode is 0.02 $cm^2$/g to 0.25 $cm^2$/g.

5. A lithium-ion secondary battery comprising the carbon electrode of claim 1, wherein the carbon electrode serves as a negative electrode.

6. A method for manufacturing the carbon electrode of claim 1, the method comprising:
preparing a natural carbon material including a natural fiber sheet containing a natural fiber or a cellulose sheet containing a cellulose fiber; and
forming a carbon electrode by carbonizing the natural carbon material,
wherein in the carbonizing process, the natural carbon material is carbonized at a temperature in which a particle size of any one of an alkaline metal particle and an alkaline earth metal particle formed while carbonizing the carbon electrode is 100 nm or less.

7. The method of claim 6, wherein in the preparing of the natural carbon material, the natural carbon material includes pulp extracted from at least one of cotton, hemp, flax, jute, kenaf, henequen, wool, and silk.

8. The method of claim 6, wherein the natural carbon material is formed in a sheet shape in which fibers having a length of 10 cm to 70 cm and a diameter of 4 μm to 200 μm are clotted.

9. The method of claim 6, wherein in the carbonizing, when the natural carbon material is the natural fiber sheet, the temperature is 900° C. or more and 1,100° C. or less, and in the carbonizing, when the natural carbon material is the cellulose sheet, the temperature is 1,300° C. or more and 1,500° C. or less.

10. The method of claim 6, wherein in the carbonizing, when the natural carbon material is the natural fiber sheet, the temperature is 1,000° C. and in the carbonizing, when the natural carbon material is the cellulose sheet, the temperature is 1,500° C.

11. The method of claim 6, wherein in the carbonizing, the alkaline metal and the alkaline earth metal formed on the carbon electrode is any one of calcium (Ca) in a solid state, magnesium (Mg) in a solid state, and potassium (K) in a solid state.

* * * * *

UNITED STATES PATENT AND TRADEMARK OFFICE
CERTIFICATE OF CORRECTION

PATENT NO. : 9,768,442 B2
APPLICATION NO. : 14/927302
DATED : September 19, 2017
INVENTOR(S) : Han et al.

It is certified that error appears in the above-identified patent and that said Letters Patent is hereby corrected as shown below:

On the Title Page

Item (56), (Abstract) at Line 15, Change "alkaline" to --alkali--.

Item (56), (Abstract) at Line 15, Change "alkaline" to --alkali--.

In the Specification

In Column 2 at Line 28, Change "alkaline" to --alkali--.

In Column 2 at Line 32, Change "alkaline" to --alkali--.

In Column 2 at Line 48, Change "alkaline" to --alkali--.

In Column 2 at Line 66, Change "alkaline" to --alkali--. (First Occurrence)

In Column 5 at Line 46, Change "alkaline" to --alkali--. (First Occurrence)

In Column 5 at Line 49, Change "alkaline" to --alkali--. (First Occurrence)

In Column 5 at Line 53, Change "alkaline" to --alkali--. (First Occurrence)

In Column 5 at Line 56, Change "alkaline" to --alkali--. (First Occurrence)

In Column 5 at Line 63, Change "alkaline" to --alkali--. (First Occurrence)

In Column 5 at Line 65, Change "alkaline" to --alkali--. (First Occurrence)

In Column 5 at Line 67, Change "alkaline" to --alkali--.

Signed and Sealed this
Fourth Day of June, 2019

Andrei Iancu
*Director of the United States Patent and Trademark Office*

CERTIFICATE OF CORRECTION (continued)

In Column 6 at Line 4, Change "alkaline" to --alkali--.

In Column 6 at Line 7, Change "alkaline" to --alkali--.

In Column 6 at Line 14, Change "alkaline" to --alkali--.

In Column 6 at Line 17, Change "alkaline" to --alkali--.

In Column 6 at Line 22, Change "alkaline" to --alkali--.

In Column 6 at Line 26, Change "alkaline" to --alkali--.

In Column 6 at Line 36, Change "alkaline" to --alkali--.

In Column 6 at Line 44, Change "alkaline" to --alkali--. (First Occurrence)

In Column 5 at Line 63, Change "alkaline" to --alkali--. (First Occurrence)

In Column 6 at Line 66, Change "alkaline" to --alkali--. (First Occurrence)

In Column 7 at Line 2, Change "alkaline" to --alkali--.

In Column 9 at Line 46, Change "alkaline" to --alkali--. (First Occurrence)

In Column 9 at Line 52, Change "alkaline" to --alkali--.

In Column 9 at Line 61, Change "alkaline" to --alkali--. (First Occurrence)

In Column 10 at Line 2, Change "alkaline" to --alkali--. (First Occurrence)

In Column 10 at Line 61, Change "alkaline" to --alkali--.

In the Claims

In Column 11 at Line 33 (approx.), In Claim 1, change "alkaline" to --alkali--.

In Column 11 at Line 38, In Claim 2, change "alkaline" to --alkali--.

In Column 12 at Line 16, In Claim 6, change "alkaline" to --alkali--.

In Column 12 at Line 38, In Claim 11, change "alkaline" to --alkali--. (First Occurrence)